3,370,408
CENTRIFUGAL SEPARATOR WITH REMOVABLE
SEPARATOR SECTION
Jack A. Lehrer and Donald P. Ross, Port Chester, N.Y.,
assignors to Universal Oil Products Company, Des
Plaines, Ill., a corporation of Delaware
Filed Jan. 28, 1965, Ser. No. 428,795
3 Claims. (Cl. 55—429)

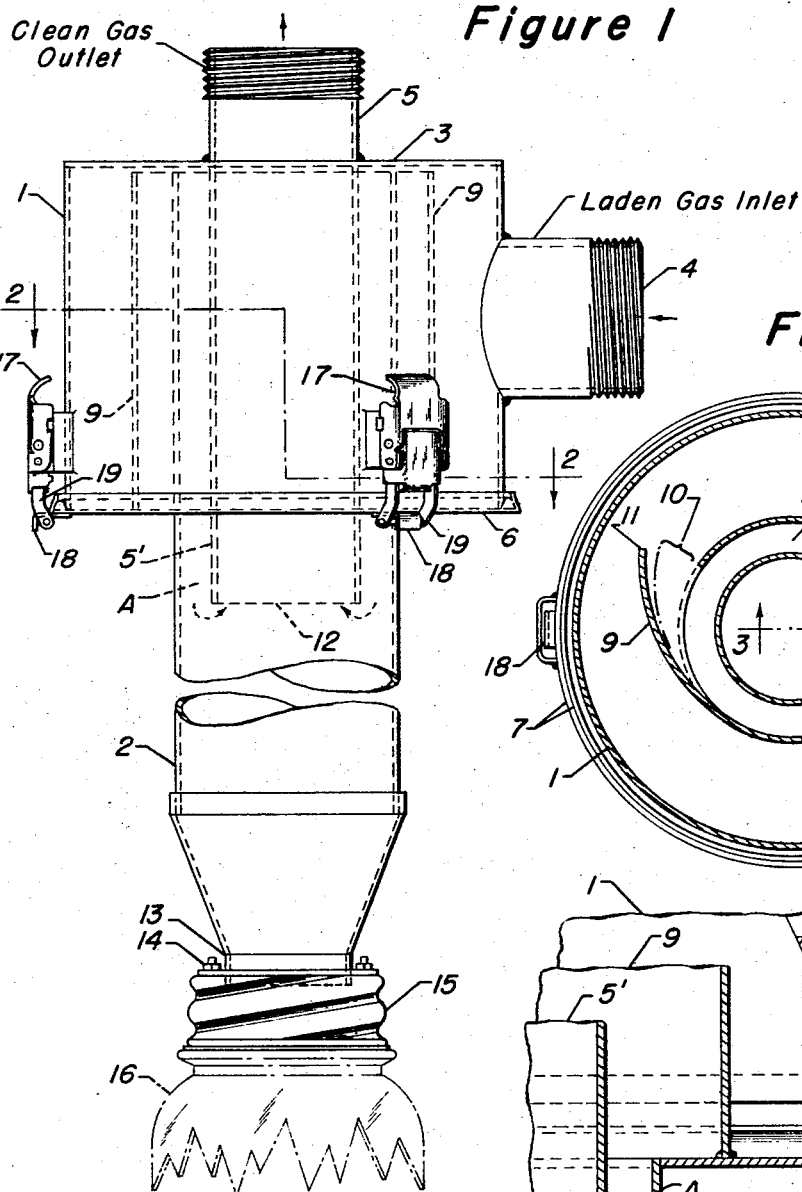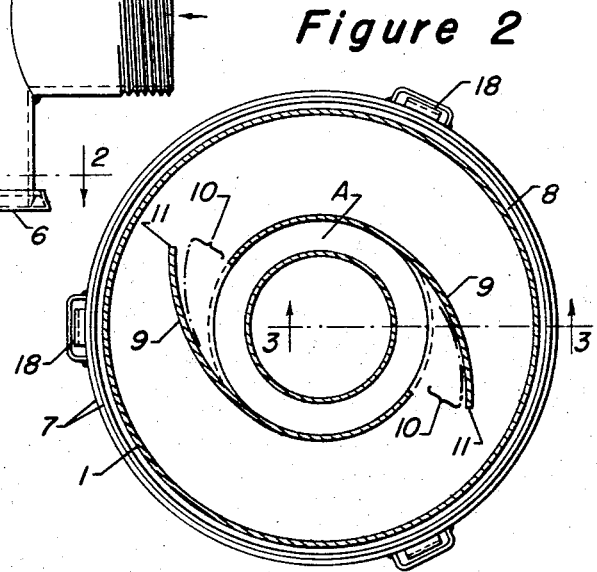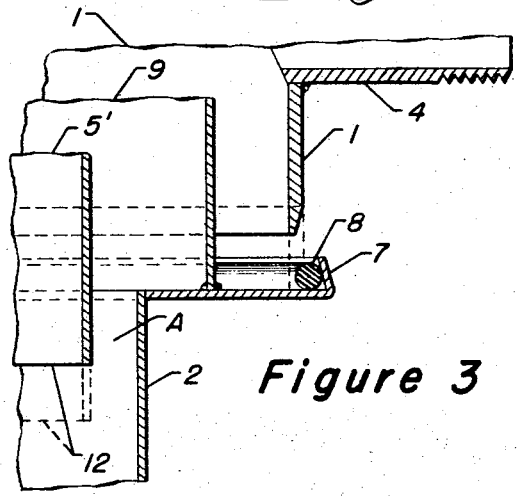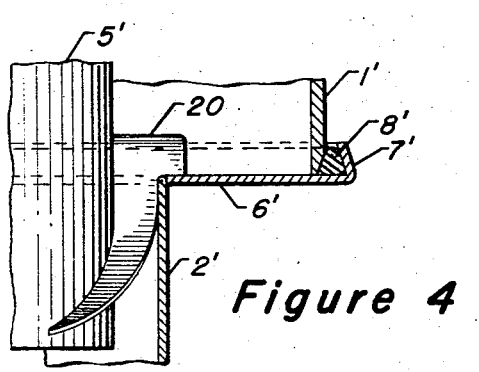

The present invention is directed to a modified centrifugal separator with a removable lower separator tube section and more particularly to a cleanable and sanitary form of centrifugal separator which provides for the quick detachability of a lower separator tube section from an upper gas inlet-gas outlet section.

In the handling of certain types of particle laden streams, there may be a tendency for some of the particulate material to adhere or collect onto the interior wall sections. As a result, it may be desirable to periodically clean the interior of the separator to preclude inefficient separation or to prevent contamination of a product stream. For example, in the food and drug industries, it is desirable to have a design which may be readily maintained or cleaned so as to meet highly sanitary standards.

It is therefore a principal object of the present invention to provide a separator with a clamped or removable lower tube portion in order to permit easy internal cleaning thereof.

A further object of the present invention is to provide a unitary upper housing section which incorporates the laden gas inlet port means, the cleaned gas off-take pipe and the outlet port means therefrom, such that the upper section may be fixedly positioned or permanently connected to the gas inlet and gas outlet lines.

Briefly, the present invention embodies an improved centrifugal separator construction that has the separator tube section detachable from an upper gas inlet-gas outlet housing section and comprises in combination, a lower tube separator section having at least one separator tube with an open-topped end portion and an open lower end portion, curved vane means positioned above and tangentially with respect to each open-topped end portion of a separator tube for guiding the laden gas stream tangentially and centrifugally into the interior thereof, an annular shaped flange-like closure plate projecting from around the outer wall of said lower separator tube section at a position below said gas inlet means thereto, a separate open-bottomed upper housing section sized to encompass said curved vane means to each separator tube of said separator tube section, with said upper section having a side-positioned gas inlet port means and a top-positioned cleaned gas outlet port, the latter connective with open-ended gas off-take pipe means, such off-take pipe means extending through said housing section to provide an off-take pipe extending axially within each lower separator tube for a short distance below the curved vane means thereto, whereby particle free gas can reverse flow direction and be discharged from said upper housing section, and clamping means connecting between said upper and lower sections holding said flange-like closure plate of the latter against the lower peripheral edge of said upper housing section.

A preferred design for the centrifugal separator with the removable lower tube section utilizes a gasket or seal ring between the side of the lower peripheral edge of the upper housing section and up-turned outer edge of the flange-like closure plate around the lower separator tube section, such that as the upper and lower sections are clamped together they will have a tight seal therebetween to preclude leakage of the inlet gas stream and particulate matter from the interior of the unit, as well as a direct contact between the two sections. The lower edge of the upper section can come into contact with the upper surface of the closure plate and thus insure that there is no tipping or misalignment between the two tubular sections.

Reference to the accompanying drawing and the following description thereof will serve to more fully describe the construction features of the modified centrifugal separator unit, as well as clarify the advantages in connection therewith.

FIGURE 1 of the drawing is a diagrammatic elevational view of a centrifugal separator unit having an upper gas inlet-outlet housing section and a detachable lower separator tube section.

FIGURE 2 of the drawing is a sectional plan view through the interior of the unit as indicated by the line 2—2 in FIGURE 1.

FIGURE 3 of the drawing is a partial sectional elevational view showing the assembly of the upper housing section with the lower separator tube section and the seal means between the two sections.

FIGURE 4 of the drawing shows another partial sectional elevational view indicating a modified type of curved vane inlet means to the lower separator tube section.

Referring now particularly to FIGURES 1, 2 and 3 of the drawing, there is indicated an improved separator unit having upper gas inlet-gas outlet housing section 1 and a detachable lower separator tube section 2. The housing section 1 is provided with a top closure portion 3, a side positioned laden gas inlet port 4 and an axially positioned clean gas off-take pipe 5. The latter has an external portion which serves as a gas outlet port means and in addition has an internally depending section 5' which carries concentrically down into the upper portion of separator tube 2 and is, of course, open-ended at the lower end 12 such that the gas stream may reverse flow from an annular space A to pass upwardly to the outlet port.

In accordance with the present improved construction and arrangement, the lower separator tube section 2 is provided with a flange-like plate 6 which is of an annular shape sized to encompass the lower peripheral edge of the housing section 1 and thus provide a lower closure and seal for the bottom of the housing section 1. As best shown in FIGURE 3 of the drawing, the outer edge of the closure plate 6 is provided with an up-turned lip section 7 adapted to hold a gasket member 8 that is in turn contacted and squeezed by the side of the lower edge of the housing 1 so as to provide a gas tight seal when the latter is clamped into contact with the top surface of closure plate 6. In FIGURE 3, the upper housing section 1 and the lower separator tube 2 with flange 6 are shown separated prior to assembly; however, as indicated by the dashed lines at the lower edge of the housing 1, the edge of the latter is particularly sized and adapted to bear against and squeeze the side of the gasket member 8 to thus effect the desired tight seal therewith.

Within the interior of the housing section 1 and above the top end of separator tube 2 and closure plate 6, there are provided a pair of curved deflector vanes 9 which in turn are individually positioned to extend tangentially with respect to the upper end portion of separator tube 2. As best shown in FIGURE 2, each of the deflector vanes 9 are sized and located to provide elongated slot-like open zones 10 which will carry the particle laden gas stream centrifugally into the upper open end portion of the separator tube 2. The vanes 9 are shown as separate curved baffle plate members which are inserted and welded or otherwise attached to the closure plate 6 so that they project tangentially from the circumference or outer wall portion of separator tube 2. An alternative equivalent construction may provide that the separator tube 2 in effect carries upwardly and concentrically through closure plate 6 and around the inner off-take pipe 5 to terminate at the upper top member 3, with the curved deflector vane members 9 being formed from portions of the wall of the tube 2 by cutting or slitting the latter and then bending back portions 9 in a tangential manner to form the open slot-like areas 10. The present embodiment indicates the use of two deflector plates 9 with open inlet slots 10; however, a single vane or more than two vanes and accompanying openings may be used to provide inlet means and the swirling centrifugal flow for in turn providing the centrifugal separation of particulate material from the inlet stream. Preferably, where two deflector vanes and two inlet openings are utilized to the top of the separator tube 2, the vanes 9 shall be placed 180° with respect to each other. Also, the outer edges 11 of deflector vanes 9 are indicated to terminate at a predetermined intermediate point within the annular space formed between the outside of the tube 2 and the inside wall of housing section 1 so that the incoming stream flow can carry to both of the inlet openings 10 and at the same time receive a centrifugal swirl immediately upon entering the housing section 1.

The particle separating action of the present device is, of course, conventional in that it is effected in the same manner as accomplished by other centrifugal separating devices. A laden gas stream is given a centrifugal flow by vanes 9 and caused to pass centrifugally and downwardly into the separator tube section 2. The particulate matter is centrifuged to the inside wall of the tube 2 and then carried downwardly along the wall to collector means. At the same time, the gaseous stream which is substantially freed of the entrained particulate material by virtue of the centrifugal action is withdrawn axially upwardly through the centrally positioned off-take pipe 5 for discharge to a cleaned gas outlet conduit. The lower open end 12 of the off-take pipe 5 is positioned at least a short distance below the lower portions of deflector vanes 9 and gas inlet areas 10 such that the centrifugal action of the gaseous stream is adequate to carry the particles against the wall of separator tube 2 and preclude their being carried upwardly with the gas stream into the off-take pipe 5.

The present embodiment indicates the lower end of separator tube 2 as having a flange means 13 and bolting means 14 to attach a screw top flange member 15 which in turn can accommodate a removable collector chamber indicated by the dashed lines 16. It is, however, not intended to limit the present device to any one type of particulate collecting means, although, in accordance with the present detachable design, the lower end of separator tube is open such that it can discharge into a suitable collecting hopper or is removably connected to a collector means such as 16, so that there may be access into the lower end of tube 2 for cleaning purposes.

Various types of clamping or attaching means may be provided to effect the assembly of the lower tube 2 or upper plate 6 with the housing section 1 so as to provide the desired detachability of the portions in accordance with the present invention. The present embodiment indicates the utilization of three manual clamping devices 17 which are spaced around the periphery of housing section 1 and adapted to engage accompanying and aligned lug members 18 projecting from the edge of closure plate 6. Each clamping member 17 has a pivoted and retractable lower hook member 19 which in turn can hook over the end of the opposing lug member 18 to tightly engage the latter. By disengaging the pivoted hook members 19 from the lugs 18 there is a releasing of the entire separator tube section 2 and closure plate member 6 from the lower periphery of housing 1 and the entire lower section, including deflector vanes 9, can be withdrawn from the housing section 1 around the inner off-take pipe 5. This detachability or removability of the tubular portions provides for the ready cleaning of the separator device for any accumulated particulate matter that may adhere to the wall surfaces and effect a clogging of the centrifugal flow, or provide for the cleaning and actual sterilization of the surfaces of the separator unit. As indicated hereinbefore, the present unit may be used in the food or drug industries when it is advisable or desirable to have means for a thorough cleaning between separate runs for different product usages.

It is, however, not intended to limit the construction to any one type of clamping or attachment means for effecting the assembly between the housing section 1 and the separator tube 2. For example, rather than the type of means indicated as 17, there may be simple bolting means provided between opposing flange sections on the housing 1 and the closure plate 6 such that the removing or loosening of bolt means through such flanges would in turn permit the detachability of one section from the other. Actually, a plurality of lower separator tube members may have a common closure plate circumscribing them and a plurality of off-take pipes may be fixedly held within an upper housing section having a single gas inlet port and a single gas outlet port. In other words, the present design may be adapted to multiple tube constructions which can handle greater volumes of gaseous streams.

Also, it is not intended to limit the present construction to any one type or shape of gasket or seal means between the upper and lower sections of the device. The seal ring 8 is indicated as round or oval in the present embodiment; however, rectangular shapes or various other shapes may be provided to effect a suitable seal between the lower plate 6 and the peripheral edge of housing 1. Although not shown in the drawing, suitable gasket means may be placed between the underside of top 3 and the upper edge portions of deflector vanes 9 so as to provide a seal therebetween; however, some leakage at this zone will not materially effect the centrifugal action of the incoming laden gas flow stream by the deflector vanes and lower efficiency.

The present gas inlet port section 4 and outlet port means 5 indicate the use of threading attachment means for connecting piping; however, it is not intended to limit the device to any one type of connector means. Actually, in accordance with the present improved means for detaching the lower tubular section from the housing section there may be fixed connections between gas inlet and outlet conduits and the housing section 1 such that the latter is in a permanent fixed position, whereby the separator tube 2, the vane members 9 and the closure plate 6 may be dropped or withdrawn from around off-take pipe 5' and from housing 1 for cleaning purposes.

In FIGURE 4 of the drawing there is shown a modified sanitary form of centrifugal separator unit providing the present desired feature of having the lower separator tube, such as 2', removable from an upper inlet section 1. The overall design of the unit of FIGURE 4 may be similar to that of FIGURES 1 and 3, except that a different type of curved vane means 20 are utilized to provide the initial centrifugally swirling motion of the laden gas stream into the lower tube 2'. The vanes 20 are preferably attached to the off-take gas tube 5' and sized such that the lower separator tube member 2' will slidably fit around the outer edge portions of the vane means 20. The exterior of tube 2' is provided with a closure plate 6', lip member 7' and a ring gasket 8' in the same manner as shown in FIGURE 3, to accommodate the lower edge of the housing 1'. Clamping means as shown in FIGURES 1 and 2 may also be provided for the modified unit to permit the easy detachability of the upper and lower sections of the unit.

We claim as our invention:
1. A centrifugal separator comprising:
(1) an upper substantially cylindrical housing section having a top closure member and an open bottom;

(2) a gas inlet port through the sidewall of said upper housing and a cleaned gas outlet port through said top closure member;

(3) a lower detachable separator tube assembly comprising:

(a) a flange-like bottom closure plate positioned across the open bottom of said upper housing and having a peripheral gasket retaining edge portion and a ring form of gasket seated therein engaging the lower side edge of the upper housing and providing a seal therewith;

(b) at least one vertical separator tube attached to and extending through said bottom closure plate, said separator tube having an open upper end portion terminating within said upper housing near the top closure member and an open lower end portion terminating below said bottom closure plate;

(c) at least one vertically elongated slot in the wall of the upper portion of said separator tube within the upper housing;

(d) a curved vertical vane means positioned tangentially from the side of said upper portion of the separator tube adjacent to and substantially coextensive with said elongated slot, said vane means being carried by said separator tube assembly;

(4) a cleaned gas off-take pipe depending from the top closure member of said upper housing, the upper end of said off-take pipe extending axially through the separator tube and connecting with said outlet port, the lower end of said off-take pipe being open and spaced below said bottom closure plate and above the lower end of the separator tube; and (5) a quickly releasable clamping means connecting between said upper housing section and said lower detachable tube assembly holding said bottom closure plate against the lower peripheral edge of said upper housing section, said clamping means including lug members spaced apart from one another and disposed around the periphery of said bottom closure plate and projecting from the edge thereof, clamping members spaced around the periphery of said upper housing and each clamping member being operatively associated with a respective one of said lug members, each clamping member having a pivoted and retractable lower hook member which releasably hooks over and tightly engages the end of the lug member associated therewith.

2. A centrifugal separator comprising:

(1) an upper substantially cylindrical housing section having a top closure member and an open bottom;

(2) a gas inlet port through the sidewall of said upper housing and a cleaned gas outlet port through said top closure member;

(3) a cleaned gas off-take pipe depending from the top closure member of said upper housing, the upper end of said off-take pipe connecting with said outlet port, and the lower end of said off-take pipe being open and terminating below the open bottom of the upper housing;

(4) a lower detachable separator tube assembly comprising:

(a) a flange-like bottom closure plate positioned across the open bottom of said upper housing and having a peripheral gasket retaining edge portion and a ring form of gasket seated therein engaging the lower side edge of the upper housing and providing a seal therewith;

(b) a vertical separator tube attached to and depending from said bottom closure plate, said separator tube being concentrically positioned around said off-take pipe and defining therewith an annular space, and said separator tube having an open upper end portion communicating with the interior of the upper housing and an open lower end portion terminating below the lower end of said off-take pipe;

(5) a plurality of curved vane means projecting from and attached spirally to said off-take pipe within said annular space, the vane means being sized to slip fit into the annular space and bear against the inner wall of the separator tube; and (6) a quickly releasable clamping means connecting between said upper housing section and said lower detachable tube assembly holding said bottom closure plate against the lower peripheral edge of said upper housing section, said clamping means including lug members spaced apart from one another and disposed around the periphery of said bottom closure plate and projecting from the edge thereof, clamping members spaced around the periphery of said upper housing and each clamping member being associated with a respective one of said lug members, each clamping member having a pivoted and retractable lower hook member which releasably hooks over and tightly engages the end of the lug member associated therewith.

3. A centrifugal separator comprising:

(1) an upper substantially cylindrical housing section having a top closure member and an open bottom, the lower side edge of said housing being inwardly beveled;

(2) a gas inlet port through the sidewall of said upper housing and a cleaned gas outlet port through said top closure member;

(3) a lower detachable separator tube asesmbly comprising:

(a) a flange-like bottom closure plate poistioned across the open bottom of said upper housing and having a peripheral gasket retaining edge portion and a ring form of gasket seated therein engaging said beveled lower side edge of the upper housing and providing a seal therewith;

(b) at least one vertical separator tube attached to and extending through said bottom closure plate, said separator tube having an open upper end portion terminating within said upper housing near the top closure member and an open lower end portion terminating below said bottom closure plate;

(c) at least one vertically elongated slot in the wall of the upper portion of said separator tube within the upper housing;

(d) a curved vertical vane means positioned tangentially from the side of said upper portion of the separator tube adjacent to and substantially coextensive with said elongated slot, said vane means being attached to the separator tube sidewall;

(e) a flange means surrounding and attached to the lower end of said separator tube and extending outwardly therefrom, bolting means attaching a screw top flange member in sealing engagement with said flange means, a screw top removable collector depending from and removably received in screw mating engagement with said screw top flange member;

(4) a cleaned gas off-take pipe depending from the top closure member of said upper housing, the upper end of said off-take pipe extending axially through the separator tube and connecting with said outlet port, the lower end of said off-take pipe being open and spaced below said bottom closure plate and above the lower end of the separator tube; and (5) a quickly releasable clamping means connecting between said upper housing section and said lower detachable tube assembly holding said bottom closure plate against the lower peripheral edge of said upper housing section, said clamping means including lug members spaced apart from one another and disposed around the periphery of said bottom closure plate and projecting from the edge thereof, clamping members spaced around the periphery of said upper housing and each clamping member being operatively associated with a respective one of said lug members, each clamping member having a pivoted and retractable lower hook member which releasably hooks over and tightly engages the end of the lug member associated therewith.

References Cited

UNITED STATES PATENTS

| | | | |
|---|---|---|---|
| 2,086,882 | 5/1937 | Seitz | 55—429 X |
| 2,134,978 | 11/1938 | Marshall | 55—429 X |
| 2,193,479 | 3/1940 | Donaldson | 55—429 |
| 2,281,610 | 5/1942 | Watson et al. | 55—348 X |
| 2,438,827 | 3/1948 | Shoffner | 55—348 X |
| 2,461,677 | 2/1949 | Burdock et al. | 55—348 |
| 2,494,465 | 1/1950 | Watson et al. | 55—459 X |
| 2,616,563 | 11/1952 | Hebb | 55—429 X |
| 2,661,078 | 12/1953 | Vance | 55—502 X |
| 2,717,054 | 9/1955 | Petersen | 55—344 |
| 3,034,647 | 5/1962 | Giesse | 55—455 X |
| 3,085,382 | 4/1963 | Finney et al. | 55—457 X |

FOREIGN PATENTS

| | | |
|---|---|---|
| 887,574 | 10/1943 | France. |
| 1,247,007 | 10/1960 | France. |
| 444,425 | 1/1949 | Italy. |
| 492,262 | 3/1954 | Italy. |
| 75,053 | 6/1954 | Netherlands. |

OTHER REFERENCES

Liebert, German printed application No. 1,035,403, (H), pub. July 1958.

HARRY B. THORNTON, *Primary Examiner.*

D. E. TALBERT, *Assistant Examiner.*